United States Patent [19]

Maglic

[11] 4,414,851
[45] Nov. 15, 1983

[54] GAUGE PRESSURE SENSOR

[75] Inventor: Rastko C. Maglic, Colorado Springs, Colo.

[73] Assignee: Motorola, Inc., Schaumburg, Ill.

[21] Appl. No.: 297,436

[22] Filed: Aug. 28, 1981

[51] Int. Cl.³ ................................................ G01L 9/12
[52] U.S. Cl. ...................................... 73/706; 73/724; 73/756; 361/283
[58] Field of Search ................ 73/706, 716, 718, 724, 73/756; 361/283

[56] References Cited

U.S. PATENT DOCUMENTS

| | | | |
|---|---|---|---|
| 2,784,593 | 5/1952 | Peucker | 73/720 |
| 2,882,731 | 4/1959 | Peucker | 73/720 |
| 2,986,938 | 6/1961 | Grandstaff | 73/706 |
| 3,496,775 | 2/1970 | Sargent | 73/718 X |
| 3,518,885 | 7/1970 | Angus | 73/722 |
| 3,548,650 | 12/1970 | Boadle | 73/862.63 |
| 3,575,054 | 4/1971 | Glista | 73/701 |
| 3,618,390 | 11/1971 | Frick | 73/718 |
| 3,623,371 | 11/1971 | Davin | 73/708 |
| 3,656,348 | 4/1972 | Bertrand | 73/701 |
| 4,103,555 | 8/1978 | Forster | 73/706 |
| 4,177,496 | 12/1979 | Bell et al. | 73/724 |
| 4,178,621 | 12/1979 | Simonelic et al. | 361/283 |
| 4,212,191 | 7/1980 | Ethridge | 73/716 X |
| 4,301,492 | 11/1981 | Paquin et al. | 73/718 X |
| 4,325,260 | 4/1982 | Takahashi et al. | 73/756 |

*Primary Examiner*—Gerald Goldberg
*Assistant Examiner*—John E. Chapman, Jr.
*Attorney, Agent, or Firm*—James W. Gillman; James S. Pristelski; Phillip H. Melamed

[57] ABSTRACT

An atmospheric differential pressure sensor is disclosed comprising a pressure transducer, having a diaphram, mounted within a two piece protective transducer housing. An ambient atmospheric pressure receiving cavity is formed by the housing and coupled to the transducer diaphragm by a pressure transmitting tube that has a isolating oil drop within the tube to keep atmospheric contaminants away from the diaphram. The atmospheric pressure receiving cavity has external openings extending peripherally over more than 180° of rotation about a central axis of said housing, and the ambient cavity provides a non-linear directional path between the end of the tube connected to the cavity and the exterior of the housing.

16 Claims, 6 Drawing Figures

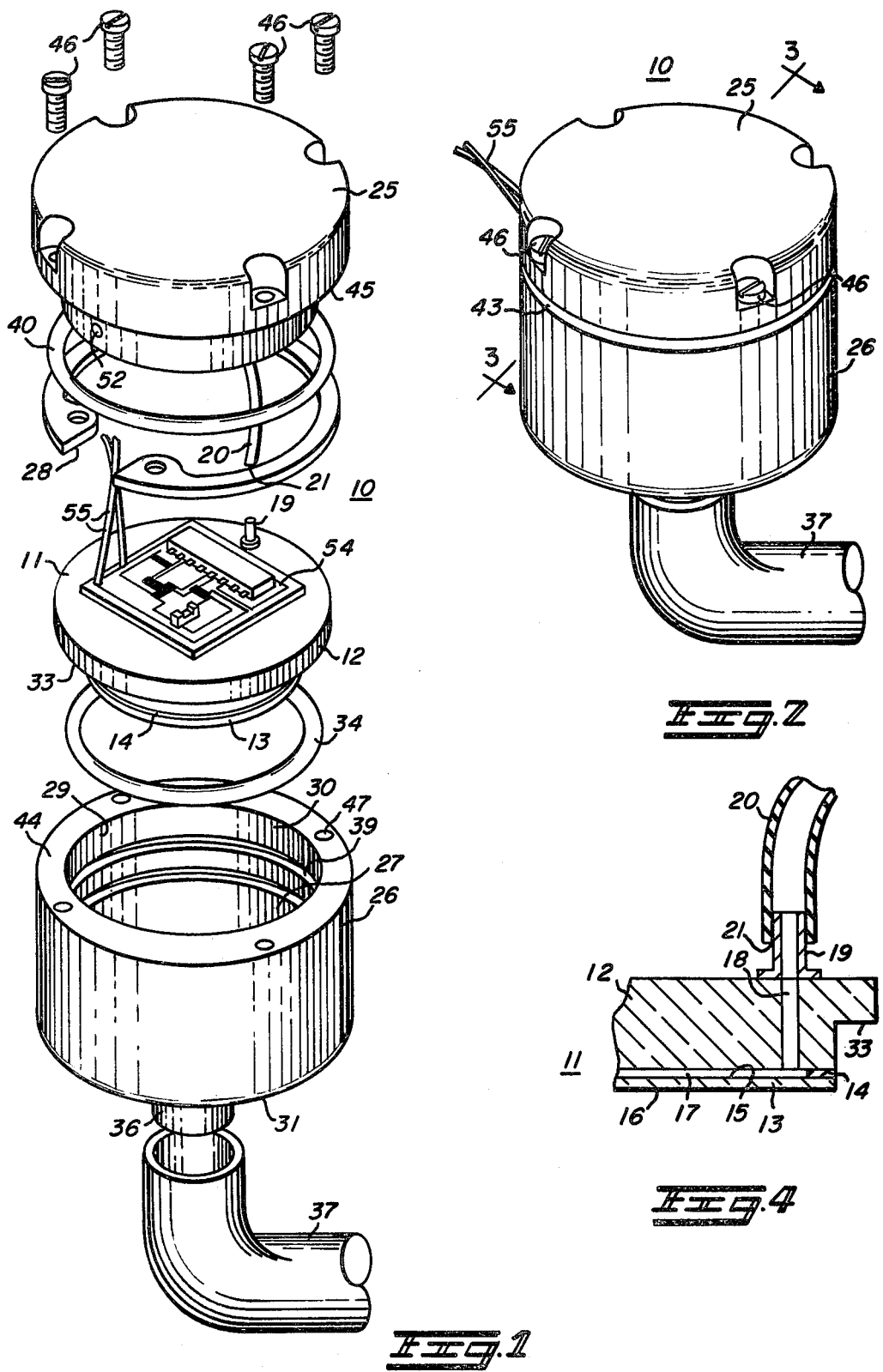

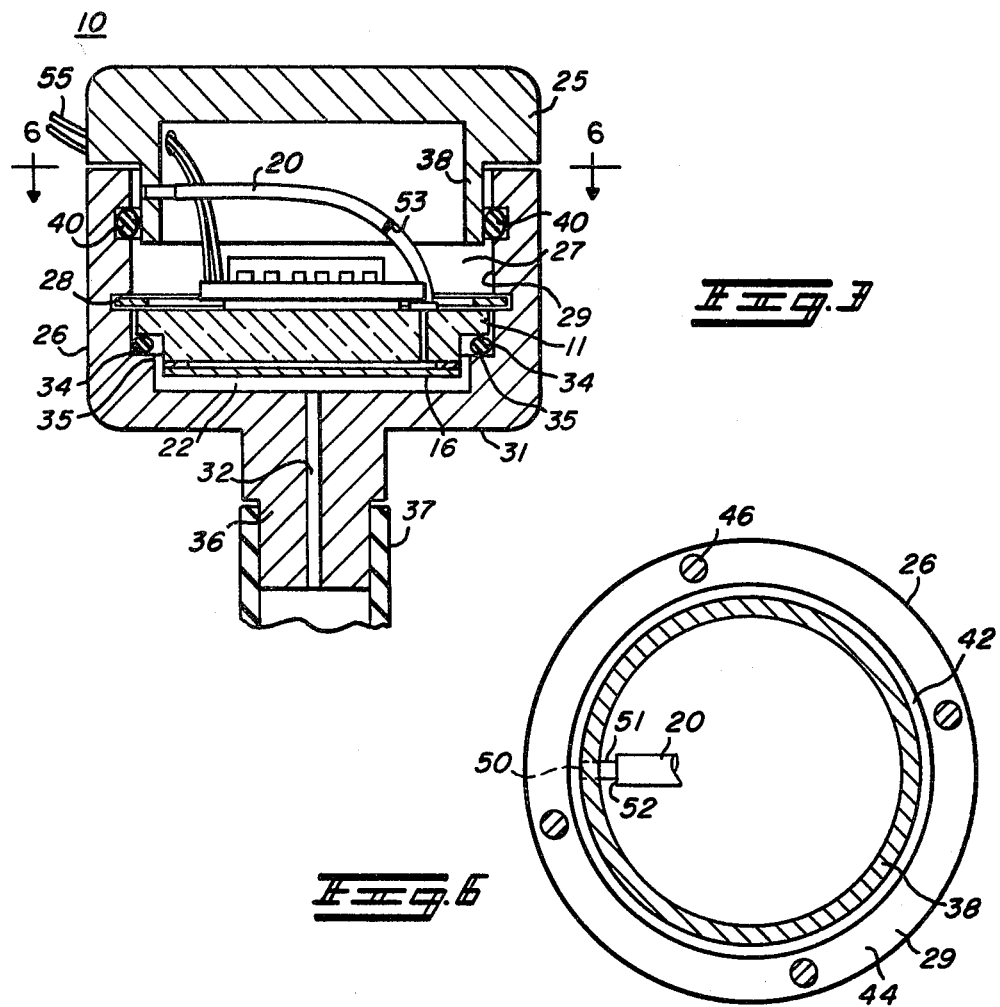
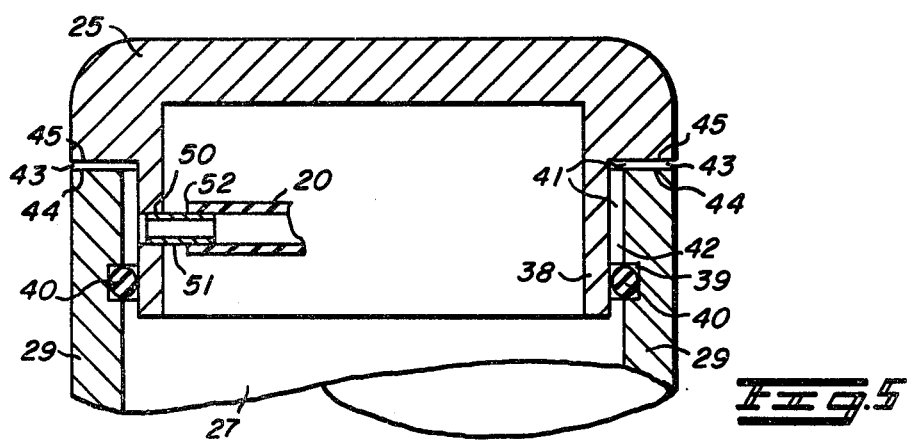

GAUGE PRESSURE SENSOR

BACKGROUND OF THE INVENTION

The present invention is related to the field of pressure sensors, and more particularly to the field of differential pressure sensors which comprise gauge pressure sensors wherein an unknown pressure is measured with respect to sensed ambient (atmospheric) pressure.

Various types of pressure sensors exist due to the use of different physical effects, such as variations in resistance and/or capacitance which occur in response to sensed pressure changes, can be used for the pressure transducer element. Here we are describing one particular gauge pressure sensor design which developed from a capacitive absolute pressure sensor. These capacitive absolute pressure sensors comprise a pressure transducer element having a displaceable diaphragm wherein a sensed pressure causes corresponding displacements of the diaphragm, which in turn either controls the position of an indicating gauge or controls corresponding electrical characteristics of the sensor that are utilized by subsequent circuitry to provide electrical signals indicative of the sensed pressure. Examples of such pressure sensors which utilize absolute pressure transducer elements, rather than gauge transducer elements, are illustrated in issued U.S. Pat. Nos. 4,178,621 and 4,380,041, both of these references being assigned to the same assignee as the present invention.

It should be noted that the term "pressure transducer" as utilized herein refers to a pressure sensing element which provides various corresponding electrical or mechanical characteristics in response to sensed pressure, whereas the term "pressure sensor" is utilized to refer to an assembly comprising the pressure sensing element itself along with the protective housing in which the sensing element is mounted, and the term may also include various electrical circuitry for converting changes in electrical characteristics to corresponding changes in the electrical characteristics, such as amplitude and/or frequency, of a corresponding pressure related electrical signal.

In absolute pressure transducers, a sensed unknown pressure is applied to one side of a pressure sensing diaphragm while a fixed predetermined reference pressure is applied to the other side of the diaphragm. Thus the displacement of the diaphragm is related to the magnitude of the sensed pressure with respect to the fixed reference pressure. For gauge pressure sensors, the sensed pressure is not compared with respect to a fixed reference pressure but is compared with respect to atmospheric pressure which will correspond to the ambient pressure surrounding the housing of the pressure sensor. For some prior absolute pressure sensors, capacitive pressure transducers have been utilized and examples of these are illustrated in the two references previously noted.

While gauge pressure sensors have existed prior to the present invention, typically their mechanical configuration has not readily permitted their use with capacitive pressure transducer elements while sufficiently guarding against the effect of contaminants in the ambient atmospheric pressure affecting the accuracy of the pressure sensing. This type of deficiency would appear to apply to any type of pressure transducer wherein pressure changes cause changes in electrical characteristics of a monitoring pressure transducer element and wherein atmospheric contaminants can affect these electrical characteristics. In addition, typical prior art gauge pressure transducers could be overly susceptible to unidirectional pressure disturbances that occurred at localized areas external to the pressure sensor housing.

SUMMARY OF THE PRESENT INVENTION

An object of the present invention is to provide a gauge pressure sensor which overcomes the aforementioned deficiencies and provides changes in electrical characteristics in response to sensed pressure while providing substantial immunity for said sensor from atmospheric contaminants and/or unidirectional pressure disturbances that may exist external to the sensor housing.

In one embodiment of the present invention, an improved gauge pressure sensor is provided which comprises: a pressure transducer including a base and a flexible diaphragm mounted to the base, the diaphragm having first and second substantially parallel opposite facing external surfaces, said base and diaphragm first external surface substantially defining an internal transducer cavity for receiving a first predetermined pressure; transducer housing means having peripheral walls and a main interior cavity, said housing means providing an outer protective mechanical shell surrounding said transducer; and mounting means for mounting said transducer in said housing means main interior cavity and fixing said transducer to said housing means; said second external diaphragm surface of said transducer and a portion of said housing means substantially defining an external transducer cavity for receiving a second predetermined pressure; said diaphragm being displaceable and flexing with respect to said transducer base in response to changes in the pressure difference between said first and second predetermined pressures wherein electrical characteristics of said transducer are altered in response to the displacement of said diaphragm and are therefore altered in response to sensed differential pressure changes, and wherein one of said first and second reference pressures is representative of the ambient atmospheric pressure existing external to said housing means; the improvement comprising the combination of an ambient pressure receiving cavity formed in said housing means for receiving pressure therein corresponding to the ambient atmospheric pressure external to said housing means, said ambient cavity including openings in said peripheral walls of said housing means providing for direct coupling from said ambient pressure receiving cavity to the ambient atmosphere external to said housing means, said openings provided peripherally about said housing means and opening directly external to said housing means, a pressure transmitting means coupled between said ambient receiving cavity and one of said internal and external transducer cavities for transmitting pressure therebetween, and an isolating means present within said pressure transmitting means for preventing direct connection of the ambient atmosphere contained in said ambient pressure receiving cavity and said one of said internal and external cavities but permitting the transmission of pressure changes therebetween by said pressure transmitting means, whereby ambient atmospheric contaminants external to said housing means are prevented from reaching and substantially impairing the operation of said transducer diaphragm thereby preventing erroneous pressure sensing operation.

Preferably, the pressure transmitting means comprises a tube having inlet and outlet ends and the isolating means corresponds to an oil drop positioned within this tube to prevent the passage of ambient atmosphere from said ambient pressure receiving cavity to said one of said internal and external transducer cavities.

Also preferably, said inlet end is coupled to said ambient pressure receiving cavity while said outlet end is coupled to said one of said internal and external transducer cavities, and a non-linear directional path is provided by said housing means between said inlet end and said peripheral openings in said peripheral walls of said housing means and between said inlet end and the exterior of the housing means. Also the peripheral openings are disposed over more than 180° of rotation about an axis passing through said housing means and centrally located. These latter features aid in making the sensor immune to unidirectional pressure disturbances that may occur external to the transducer housing means since no direct path is provided between the pressure transmitting tube inlet and the exterior of the housing means.

The above discussed objects and structure of the present invention, as well as many additional objects and beneficial structural limitations of the present invention, are discussed in detail subsequently in connection with the detailed description of the preferred embodiment.

BRIEF DESCRIPTION OF THE DRAWINGS

For a more complete understanding of the present invention, reference should be made to the drawings in which:

FIG. 1 is an exploded perspective view illustrating elements comprising a gauge pressure sensor constructed in accordance with the present invention;

FIG. 2 is a perspective view showing the assembled sensor illustrated in FIG. 1;

FIG. 3 is a cross-sectional view of the sensor shown in FIGS. 1 and 2 taken along line 3—3;

FIG. 4 is an expanded cross-sectional view illustrating in more detail a portion of FIG. 3;

FIG. 5 is an expanded cross-sectional view illustrating in more detail another portion of the cross-sectional view of FIG. 3; and FIG. 6 is a cross-sectional view of the pressure sensor shown in the preceding Figures taken along the line 6—6 in FIG. 3.

DETAILED DESCRIPTION OF THE PREFERRED EMBODIMENT

FIG. 1 illustrates an exploded view of a gauge pressure sensor 10 which is preferably utilized to sense automobile vacuum (manifold) pressure and provide a corresponding electrical signal related to the difference between the sensed automotive vacuum and ambient atmospheric pressure. The actual pressure sensing element of the sensor 10 comprises a gauge pressure transducer 11 which is best illustrated in cross-sectional detail in FIG. 4. It should be noted that in all of the figures identical reference numbers are utilized to identify corresponding elements. In FIG. 3 some elements are not shown in cross-section so as to simplify this figure.

The pressure transducer 11 is a capacitive pressure transducer having a base 12 and a flexible diaphragm 13 which is mounted to the base by an insulating and sealing ring 14. The diaphragm 13 has first and second substantially parallel but opposite facing external surfaces 15 and 16, and the first external surface 15 and the transducer base 12 substantially define an internal transducer cavity 17, sealed by ring 14, which in the preferred embodiment of the present invention will receive a first predetermined pressure directly related to the ambient atmospheric pressure that surrounds the sensor 10. This ambient related pressure is applied to the cavity 17 through a through opening 18 which passes through the base 12 and opens into the cavity 17. A metal interface element 19 is illustrated in FIG. 4 as being positioned adjacent to the through opening 18 to facilitate the applying of the first predetermined pressure to the cavity 17 through the use of a pressure transmitting tube 20 having an outlet end 21 coupled to interface element 19.

In essence, the pressure transducer 11 functions by displacing and flexing the diaphragm 13 in accordance with the pressure difference between the pressure in the cavity 17 and the pressure external to the transducer which is applied to the diaphragm surface 16. In accordance with this differential pressure and the displacing of the diaphragm 13, electrical characteristics of the transducer are altered thus providing an electrical indication with regard to the sensed differential pressure. Preferably the transducer 11 comprises a capacitive pressure transducer wherein the base 12 itself or an electrode deposited on the base 12, forms one stationary electrode of a capacitor and the diaphragm 13 itself, or an electrode positioned on the diaphragm surface 15, forms a movable electrode of the capacitor with the capacitance provided by these electrodes being directly related to the sensed differential pressure.

The general configuration of the pressure transducer 11 utilized in the present invention generally corresponds to the capacitor pressure transducers illustrated in U.S. Pat. Nos. 4,178,621 and 4,380,041, both assigned to the same assignee as the present invention. In both of these references an absolute pressure transducer is illustrated wherein the internal transducer cavity has a fixed pressure therein and the internal cavity is totally sealed by sealing an opening corresponding to the through opening 18, whereas in the present invention it is contemplated that the internal transducer cavity 17 receives a first predetermined pressure which is related to, and therefore representative of, the ambient atmospheric pressure external to the pressure sensor 10.

While the preferred embodiment of the present invention deals with a capacitive pressure transducer, it should be understood that any other type of pressure transducer element can be utilized wherein the displacement of a diaphragm is utilized to alter electrical characteristics of the transducer that in turn are utilized to provide an electrical signal or other indication with respect to the differential pressure being sensed. In the present case the differential pressure being sensed is the difference between the pressure within the internal transducer cavity 17 and a second predetermined reference pressure which is applied to an external transducer cavity 22 which is best illustrated in FIG. 3 and which is partially defined and bordered by the second external surface 16 of the diaphragm 13.

The pressure sensor 10 includes a transducer housing means which basically comprises a housing cover 25 and a separate main housing body 26. Together the cover 25 and main body 26 provide an outer protective mechanical shell which surrounds and thereby protects the pressure transducer 11 which is mounted within a main interior cavity 27 of the main housing body 26 by any preferred type of mounting structure 28. The mounting structure 28 can comprise such things as a C-clamp ring (shown in FIGS. 1 and 3) which fits within an interior groove in peripheral walls 29 of the main housing body 26, or it can comprise merely droplets of epoxy. Any type of mounting mechanism can be used for the mounting means 28 since this element merely positions the transducer 11 within the main housing interior cavity 27 and fixes the transducer to the housing means. It should be noted that the pressure transmitting tube 20 is also positioned within the cavity 27.

The main housing body 26 essentially has the shape of a hollow cylinder with the cylinder sidewalls formed by peripheral cylindrical walls 29 and the cylinder interior corresponding to the main cavity 27. The cylinder has an open end 30 and a substantially closed end formed by an end wall 31 having an opening 32 therein which opens into the external transducer cavity 22 that is substantially defined by the external diaphragm surface 16 and the closed end wall 31 of the main housing body 26. The transducer base 12 has an extending annular flange portion 33 which cooperates with a sealing O-ring 34 that rests on interior shoulders 35 of the main housing body 26 to seal and separate the external cavity 22 from the rest of the main interior cavity 27 of the main housing body.

A pressure connecting interface mechanism 36 is either affixed to or formed as part of the main housing body 26 at the opening 32 and allows the connection of a pressure conducting tube 37 thereto so that a sensed predetermined pressure may be applied to the external transducer cavity 22 for sensing by the transducer. Preferably the pressure applied to the external cavity 22 through the tube 37 corresponds to the vacuum or manifold pressure developed by an automobile, but of course other pressures which are desired to be sensed can be applied to the cavity 22. It should be noted that the pressure connecting interface mechanism 36 can comprise any mechanical hardware which allows the connection of a pressure conducting tube to the main housing body 26 for applying a pressure to the external cavity 22 through the opening 32. Thus the interface mechanism 36 can comprise a threaded member or any standard tube interface mechanism such as a small tube press fit into the opening 32 and having an extending enlarged head extending exterior to the main housing body 26 over which the pressure conducting tube 37 can be press fit.

Essentially the pressure sensor 10 functions by performing a differential comparison between the first reference pressure contained in the internal transducer cavity 17 with respect to the second pressure applied to the external transducer cavity 22. The present invention deals with a gauge sensor in which a reference pressure related to ambient atmospheric pressure is applied to the interior cavity 17 for comparison with a sensed unknown pressure, preferably corresponding to the automobile manifold pressure, that is applied to the external cavity 22. Of course it will be appreciated that modifications to the present invention can be accomplished so that the unknown pressure can be applied to the internal cavity while the reference pressure related to atmospheric pressure is applied to the external cavity while still maintaining the benefits of the present invention.

It should be noted that the general configuration for mounting the transducer 11 within the main housing body 26 through the use of the annular extending flange 33 and the O-ring 34 is acknowledged to be prior art and is generally illustrated in U.S. Pat. No. 4,380,041 and assigned to the same assignee as the present invention.

One main feature of the present invention deals with constructing the pressure sensor 10 such that an unknown pressure to be sensed is compared with the ambient atmospheric pressure that exists external to the transducer housing means comprising the housing cover 25 and main housing body 26, and that this is accomplished without subjecting the transducer 11 and its diaphragm 13 to atmospheric contaminants. Another feature of the present invention deals with substantially immunizing the pressure sensor from the effects of unidirectional pressure disturbances which may occur external to the transducer housing means. It is contemplated that the unidirectional pressure disturbances referred to in the preceding sentence comprise such things as the application of a unidirectional high pressure water or steam beam which is utilized for cleaning wherein this unidirectional localized pressure disturbance could, in prior gauge pressure sensors, cause permanent damage to the sensors. The gauge pressure sensor 10 is constructed to substantially eliminate the problems discussed above and this is accomplished primarily by the combination of the following structural limitations in combination with the sensor structure previously recited.

As best illustrated in FIG. 5, the housing cover 25 matingly fits with the main housing body 26 so as to substantially close the open end 30 of the main housing body and therefore close the main interior cavity 27. More specifically, the housing cover 25 has an extending annular cylindrical portion comprising cylindrical peripheral walls 38 which fit within the peripheral cylindrical walls 29 of the main housing body 26. An inner annular peripheral channel 39 is formed on the inside surface of the cylindrical walls 29 and a sealing O-ring 40 is positioned therein.

Essentially the cylindrical walls 29 of the main housing body, the cylindrical walls 38 of the housing cover 25 and the O-ring 40 form a peripheral ambient atmospheric pressure receiving cavity 41 which includes the spacing between the cylindrical walls 38 and 29, which is typically 0.002 to 0.006 inches and which essentially forms an inner peripheral annular cavity 42. The ambient pressure receiving cavity 41 is formed in the housing means and by the housing cover 25 and body 26 and also includes annular peripheral openings 43 which open directly external to the transducer housing means and which open into the annular cavity 42. The ambient cavity 41 receives the ambient atmosphere external to the housing means. The openings 43 are formed by the spacing between end peripheral portions 44 of the cylindrical walls 29 and an annular peripheral end shoulder portion 45 of the housing cover 25.

It should be noted that it is contemplated that the housing cover 25 is attached to the main housing body 26 by four attachment screws 46 which pass through the housing cover 25 and screw into threaded openings 47 in the annular end portions 44 of the main housing body. The spacing between the annular end portions 44 of the main housing body and the annular shoulder portion 45 of the housing cover is determined by the torque applied to the screws 46 in assembling the cover to the main housing body, and it has been found that applying a torque sufficient to create a gap spacing between the elements 44 and 45 of 0.001 to 0.003 inches is most beneficial in obtaining the desired results of the present invention.

A pressure inlet wall opening 50 is provided in the housing cover cylindrical walls 38 and the wall opening 50 has one end opening into the ambient atmospheric pressure receiving cavity 41 and another end coupled by a metal tube 51, which is press fit inserted into the opening 50, to an inlet end 52 of the pressure transmitting tube 20. An oil drop 53 is positioned within the pressure transmitting tube 20 and performs an isolation function to separate the ambient atmosphere contained in the ambient receiving cavity 41 from the internal transducer cavity 17.

After assembly of the housing cover 25 to the main housing body 26 it should be noted that a major portion of the interior cavity 27 of the main housing body 26 is isolated from (not directly coupled to) the ambient atmospheric pressure surrounding the transducer housing due to the sealing performed by the O-ring 40 and the walls 38 and 29. This major portion of the interior cavity 27 is also isolated from the sensed pressures applied to the cavity 22 due to the sealing performed by the sealing O-ring 34. Thus it is contemplated that additional sensor electrical circuitry 54 may be positioned within the major portion of cavity 27 without subjecting this additional electrical circuitry to adverse influences from either the ambient atmospheric pressure or engine manifold pressure. Electrical output lead wires 55 are connected to the circuitry 54 and pass through openings in the housing cover 25 for providing an electrical signal, outside the housing, related to the sensed pressure. The lead openings are sealed to prevent the external atmosphere from entering the cavity 27.

Essentially, the pressure transmitting tube 20 has atmosphere contained in its inlet end 52 directly coupled to the ambient receiving cavity 41 and atmosphere contained in its outlet end 21 directly coupled to the internal transducer cavity 17 with the tube 20 continuously transmitting all pressure changes therebetween. The oil drop 53 disposed within the pressure transmitting tube 20 forms an isolating means for preventing a direct connection of the atmosphere in the ambient receiving cavity 41 to the diaphragm 13 while still permitting the transmission of pressure changes therebetween by the pressure transmitting tube 20. The actual pressure contained in the internal transducer cavity will therefore be related to and representative of the atmospheric pressure in cavity 41 while the oil drop 53 isolates the ambient atmosphere from the transducer 11. This allows the pressure sensor 10 of the present invention to provide a differential pressure sensing reading with respect to ambient atmospheric pressure without subjecting the transducer diaphragm 13 to the harmful effect of atmospheric contaminants.

Atmospheric contaminants can comprise moisture in the form of water droplets or humidity which when placed in contact with the diaphragm of a pressure transducer, especially a capacitive pressure transducer, can cause corrosion of a diaphragm electrode and/or substantial alteration of the electrical characteristics determined by the physical displacement of the diaphragm. In addition, atmospheric contaminants may be in the form of gaseous ions that also can produce erratic changes in the electrical characteristics of the pressure transducer, and suspended particles in the atmosphere can likewise adversely affect pressure transducer operations. The present invention provides substantial immunity from these atmospheric contaminants by essentially isolating the sensed atmospheric pressure through the use of the pressure transmitting tube 20 which contains therein the oil drop 53 that prevents the direct transmission of the atmosphere to the pressure transducer diaphram. In order to ensure that this isolation is maintained, the total volume of the pressure transmitting tube 20 should be designed so that it is more than twice as much as the total volume of the internal transducer cavity 17. This will ensure, assuming the drop 53 is positioned midway in the tube 20, that even during the largest possible excursions expected for pressures applied to the external transducer cavity 22, the oil drop 53 will not be displaced sufficiently to leave the tube 20 and thereby eliminate atmospheric isolation for the sensor 10 by permitting atmospheric contaminants to enter the internal transducer cavity 17.

It should be realized that by modification of the present design the pressure transmitting tube 20 could be coupled to a transducer cavity corresponding to the external cavity 22 while the engine manifold pressure could then be coupled to the interior transducer cavity 17, and the basic principle of the present invention would still be applicable. Also, modification of the present design to provide for an additional pressure isolating means to isolate the sensed engine manifold pressure from the pressure actually applied to the external cavity 22 is possible.

A significant feature of the present invention is that there exists no direct linear path from the ambient atmospheric pressure external to the transducer housing means and the inlet end 52 of the pressure transmitting tube 20. This is significant in preventing the pressure sensor from rendering an erroneous reading due to a linear localized pressure disturbance provided external to the transducer housing wherein this disturbance could be caused by the external application of a linear cleaning beam, comprising either steam or water, which is directed at the transducer housing. Clearly, FIG. 5 of the present drawings illustrates that a non-linear directional path is provided by the housing means, comprising the housing cover 25 and main housing body 26, between the inlet end 52 of the pressure transmitting tube 20 and the exterior of the housing means. This configuration substantially immunizes the pressure sensor 10 from localized linear pressure disturbances external to the housing since the openings 43, which provide a direct coupling path from the ambient pressure receiving cavity 41 to ambient atmospheric pressure external to the housing, extend over more than 180 degrees of rotation about a centrally located axis 60 passing through the housing means. Thus a linearly directed external pressure beam cannot completely distort the pressure in the inner cavity 42. The non-linear path provided by the housing means from the inlet end 52 to the exterior of the housing means also somewhat inhibits the passage of atmospheric contaminants to the tube 20.

It should be noted that the term "annular peripheral openings" 43 actually represents a peripheral gap between the housing cover 25 and the end portions 44 of the main housing body 26 and that while this configuration is preferred, obviously the providing of a plurality of discrete holes coupling the atmospheric pressure external to the housing means to the annular cavity 42 would provide a similar result as long as there existed no linear connection path directly coupling the inlet 52 to the exterior of the housing means.

It should also be noted that while the present invention contemplates the housing cover cylindrical walls 38 fitting within the cylindrical walls 29 of the main housing body 26, certainly an equivalent structure can be developed in which the cover walls extend outside the main housing body walls while still maintaining the essence of the present invention. Therefore all that is required in the preferred embodiment is that a portion of either the top cover or the main housing body fits around the periphery of the other element wherein the overlap between these elements partially defines the peripheral annular cavity 42 of the ambient atmospheric pressure receiving cavity 41. It should be noted that the sealing O-ring 40 is positioned between the overlapping walls 29 and 38 to seal the main cavity 27 from the ambient cavity 41. Also, while cylindrical shapes have been illustrated for the housing cover 25 and main housing body 26, certainly other geometric shapes, such as rectangular shapes, could be utilized.

While I have shown and described specific embodiments of this invention, further modifications and improvements will occur to those skilled in the art. All such modifications which retain the basic underlying principles disclosed and claimed herein are within the scope of this invention.

I claim:

1. In a gauge pressure sensor comprising:
 a pressure transducer including a base and a flexible diaphragm mounted to said base, said diaphragm having first and second substantially parallel opposite facing external surfaces, said base and diaphragm first external surface substantially defining an internal transducer cavity for receiving a first predetermined pressure;
 transducer housing means having peripheral walls and a main interior cavity, said housing means providing an outer protective mechanical shell surrounding said transducer; and
 mounting means for mounting said transducer in said housing means main interior cavity and fixing said transducer to said housing means;
 said second external diaphragm surface of said transducer and a portion of said housing means substantially defining an external transducer cavity for receiving a second predetermined pressure;
 said diaphragm being displaceable and flexing with respect to said transducer base in response to changes in the pressure difference between said first and second predetermined pressures wherein electrical characteristics of said transducer are altered in response to the displacement of said diaphragm and are therefore altered in response to sensed differential pressure changes, and wherein one of said first and second reference pressures is representative of ambient atmospheric pressure existing external to said housing means;
 the improvement comprising the combination of:
 an ambient pressure receiving cavity formed in and by said housing means and opening directly external to said housing means for receiving therein the atmospheric pressure external to said housing means, said ambient cavity including openings in said peripheral walls of said housing means providing for direct coupling to the ambient atmosphere external to said housing means to said ambient pressure receiving cavity, said openings provided peripherally about said housing means and opening directly external to said housing means, said peripheral openings disposed over more than 180 degrees of rotation about an axis passing through said housing means and centrally located,
 a pressure transmitting means comprising a tube provided in said main interior cavity of said housing means and having inlet and outlet ends, said inlet end coupled to and receiving the atmosphere in said ambient pressure receiving cavity and said outlet end coupled to and receiving the atmosphere in one of said internal and external transducer cavities, said pressure transmitting means transmitting pressure between said ambient pressure receiving cavity and said one of said internal and external cavities, and
 an isolating means comprising a fluid present within said tube for preventing direct connection of the atmosphere contained in said inlet end with said atmosphere contained in said outlet end but permitting the transmission of pressure changes therebetween by said pressure transmitting means, whereby ambient atmospheric contaminants external to said housing means are prevented from reaching and substantially impairing the operation of said transducer diaphragm thereby preventing erroneous pressure sensing operation.

2. A gauge pressure sensor according to claim 1 wherein said isolating means comprises at least an oil drop positioned within said tube between said inlet and outlet ends.

3. A gauge pressure sensor according to claim 2 wherein said outlet end is directly coupled to said internal transducer cavity.

4. A gauge pressure sensor according to claim 1 wherein said ambient pressure receiving cavity is defined by and separated from said housing means interior cavity by walls of said housing means and a sealing means which together isolate said ambient pressure receiving cavity from said interior cavity of said housing means.

5. A gauge pressure sensor according to claim 4 wherein said ambient pressure receiving cavity comprises an annular channel and wherein said sealing means comprises an O-ring.

6. A gauge pressure sensor according to claim 5 wherein said transducer is a capacitive transducer having a first electrode movable with said diaphragm and a second electrode stationary and associated with said transducer base, displacement of said diaphragm in response to sensed pressure changes causing changes in the capacitance between said first and second electrodes.

7. A gauge pressure sensor according to claim 1 wherein a non-linear directional path is provided by said housing means and said openings and said ambient pressure receiving cavity between said inlet end of said tube and the exterior of said housing means.

8. A gauge pressure sensor according to claim 7 wherein said ambient pressure receiving cavity comprises an annular peripheral channel defined by peripheral walls of said housing means and distinct from said main interior cavity.

9. A gauge pressure sensor according to any of claims 1, 2 or 8 wherein said housing means comprises a housing cover and a separate main housing body, said main housing body having said transducer mounted within a main cavity therein bounded by outer walls of said main housing body with said housing body having at least one open end, said housing cover matingly fitting said housing body to substantially close said one open end, peripheral shoulder portions of one of said housing cover and said main housing body disposed around peripheral portions of the other one of said housing cover and said main housing body with these peripheral portions partially defining said ambient pressure receiving cavity.

10. A gauge pressure sensor according to claim 9 which includes a sealing means positioned between said peripheral portions of said housing cover and housing main body which form said ambient pressure receiving cavity, and said sealing means forming a boundary for said ambient pressure receiving cavity and separating this cavity and the ambient atmosphere contained therein from said main cavity in said housing body in which said transducer is positioned.

11. A gauge pressure sensor according to claim 10 wherein said inlet end of said tube is coupled through a hole in said peripheral portions of one of said housing cover and main housing body to said ambient pressure receiving cavity.

12. A gauge pressure sensor according to claim 11 wherein said main housing body substantially comprises a hollow body substantially sealed at one end by an end wall except for a pressure transmitting opening which opens into said main housing body cavity, and wherein said end wall, said external transducer surface and a second sealing means form said external transducer cavity, with said second sealing means isolating said external transducer cavity from a portion of said main cavity in said housing body.

13. A gauge pressure sensor according to claim 12 wherein sensor electrical circuitry is positioned in said portion of said main cavity and is isolated from said ambient pressure receiving cavity and said external transducer cavity.

14. A gauge pressure sensor according to claim 13 wherein said tube passes through said portion of said main cavity while maintaining isolation of said portion of said main cavity from said ambient pressure receiving cavity and said internal transducer cavity.

15. A gauge pressure sensor according to claim 10 which includes sensor electrical circuitry positioned in said main cavity and separated from said ambient atmosphere in said ambient pressure receiving cavity by said sealing means which separates the ambient atmosphere contained in said ambient pressure receiving cavity from said main cavity in said housing body.

16. A gauge pressure sensor according to claim 15 wherein said sensor electrical circuitry is mounted on said transducer base, and wherein leads from said sensor electrical circuitry pass through openings in said transducer housing means which are sealed to prevent external atmosphere from entering said housing means main interior cavity.

* * * * *